(12) United States Patent
Tang et al.

(10) Patent No.: US 11,379,715 B2
(45) Date of Patent: Jul. 5, 2022

(54) DEEP LEARNING BASED DISTRIBUTION OF CONTENT ITEMS DESCRIBING EVENTS TO USERS OF AN ONLINE SYSTEM

(71) Applicant: Meta Platforms, Inc., Menlo Park, CA (US)

(72) Inventors: Lijun Tang, San Jose, CA (US); Huihong Zhao, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1091 days.

(21) Appl. No.: 15/843,913

(22) Filed: Dec. 15, 2017

(65) Prior Publication Data

US 2019/0188561 A1 Jun. 20, 2019

(51) Int. Cl.
| | |
|---|---|
| *G06N 3/08* | (2006.01) |
| *G06F 16/9535* | (2019.01) |
| *H04L 67/50* | (2022.01) |
| *H04L 67/306* | (2022.01) |
| *H04L 67/55* | (2022.01) |
| *G06F 16/335* | (2019.01) |
| *H04L 67/02* | (2022.01) |

(52) U.S. Cl.
CPC ............. *G06N 3/08* (2013.01); *G06F 16/337* (2019.01); *G06F 16/9535* (2019.01); *H04L 67/22* (2013.01); *H04L 67/26* (2013.01); *H04L 67/306* (2013.01); *H04L 67/02* (2013.01)

(58) Field of Classification Search
CPC ....................................................... G06N 3/08
See application file for complete search history.

(56) References Cited

U.S. PATENT DOCUMENTS

| | | | |
|---|---|---|---|
| 8,831,358 B1* | 9/2014 | Song ..................... | G06K 9/46 382/218 |
| 9,760,690 B1* | 9/2017 | Petkov .................... | G06T 5/00 |
| 2011/0289422 A1* | 11/2011 | Spivack ............... | G06F 16/951 715/739 |
| 2016/0048887 A1* | 2/2016 | Joshi .................. | G06Q 30/0271 705/14.67 |
| 2017/0161393 A1* | 6/2017 | Oh ........................ | H04L 51/32 |
| 2019/0251423 A1* | 8/2019 | Shazeer .................. | G06N 3/08 |

* cited by examiner

*Primary Examiner* — Daniel T Pellett
(74) *Attorney, Agent, or Firm* — Fenwick & West LLP (57) ABSTRACT

An online system distributes content items describing events to one or more users of the online system. The online system receives, an event from a third-party system, the event associated with one or more content items. The online system determines a vector representation of users based on a first neural network and a vector representation of an event based on a second neural network. The online system jointly trains the first neural network and second neural network based on labels describing user entity relationships. The online system determines a likelihood of attendance of an event by a user based on a distance between the vector representation of the user and the vector representation of the entity. The online system provides the content associated with the event to users of the online system based on the likelihood of attendance of the event by the users.

20 Claims, 6 Drawing Sheets

DEEP LEARNING BASED DISTRIBUTION OF CONTENT ITEMS DESCRIBING EVENTS TO USERS OF AN ONLINE SYSTEM

FIELD OF INVENTION

This disclosure concerns the distribution of content to users of an online system in general, and more specifically to model (e.g., neural network) based targeting of content items describing an event to users of the online system.

BACKGROUND

Online systems such as social networking systems provide content to users, for example, content provided by other users or by third party content providers. Third party content providers often use online systems to distribute their content to users of the online systems if the online system has a large user base. An example of content distributed by the online system is content describing events, for example, events associated with third party content providers or events associated with users of the online system. The content items describing future events are typically distributed before the event occurs to inform users of the event. Furthermore, users are typically interested in very specific types of events. Providing content items describing events to users that are unlikely to be interested in particular events provides poor user experience and also wastes resources of the online system, for example, network resources and processing resources.

SUMMARY

Embodiments provide content associated with events to users determined to have more than a threshold likelihood of attending the event. The online system extracts vectors representing users as embeddings from a first neural network, and vectors describing events as embeddings from a second neural network. The online system jointly trains the first neural network and the second neural network using training data describing relationships between users and events. The joint training results in mapping of the vector representation of the users and events to the same latent space. Accordingly, the online system determines a likelihood of a user being interested in an event based on a measure of distance between the vector representation of a user and the vector representation of an event. The online system provides content associated with events to users determined to have more than a threshold likelihood of being interested in the event and therefore attending the event.

In an embodiment, the user data provided as input to the first neural network is based on one or more of, user demographic information, membership of users in groups, user interactions with content such as web pages, and so on. The event data provided as input to the second neural network is based on one or more of, a subject of the event, a location of the event, and so on.

In an embodiment, the online system periodically generates vectors describing users and generates the vector describing an event responsive to receiving information describing the event, for example, from a third party system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1A:
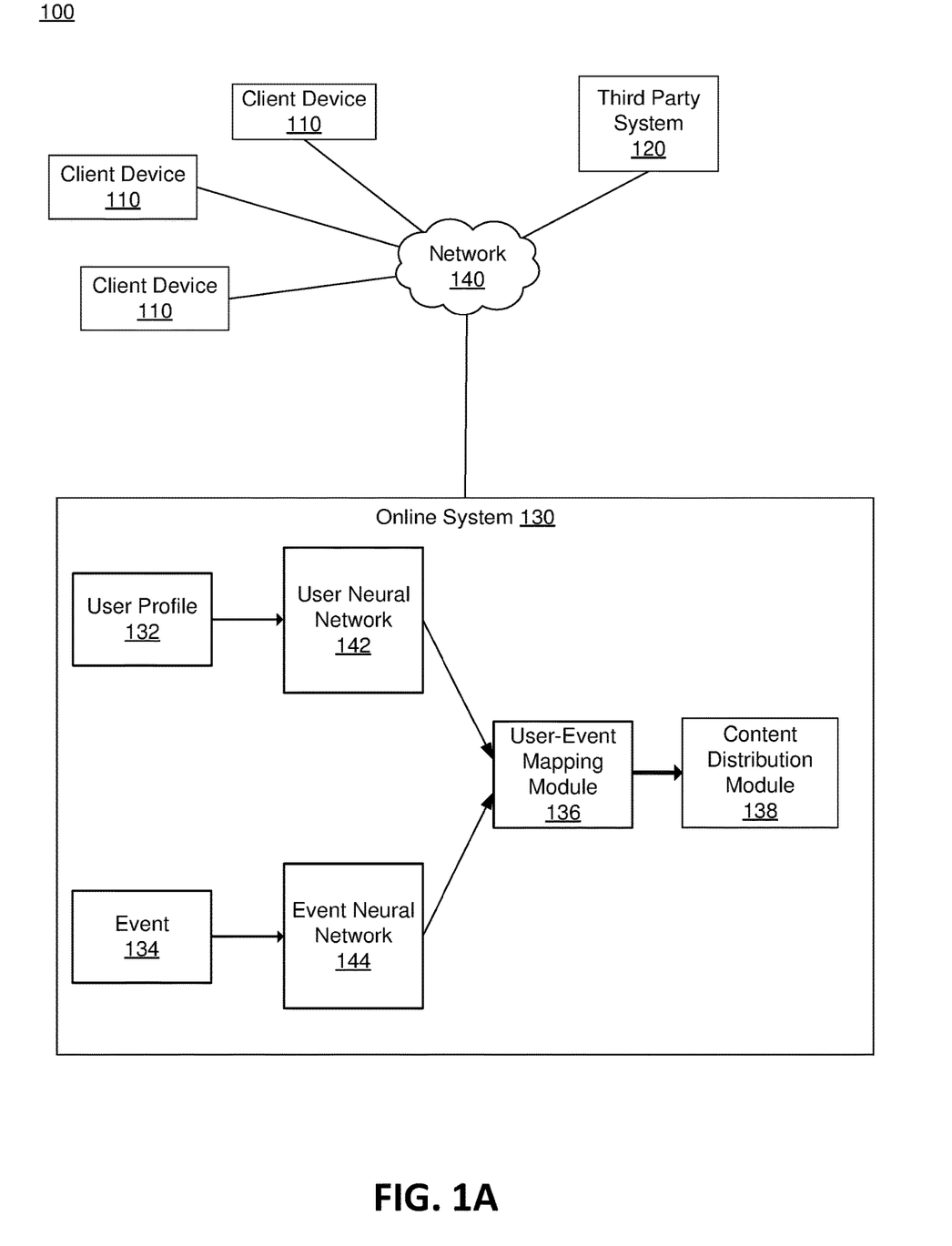
FIG. 1A is a high-level block diagram of a system environment in which an online system operates, in accordance with an embodiment.

FIG. 1A is a block diagram of a system environment 100 for an online system 130. The system environment 100 shown by FIG. 1A comprises one or more client devices 110, a third party system 120, online system 130, and a network 140. The online system 130 provides a framework for distributing content associated with events within the online system 130. In alternative configurations, different and/or additional components may be included in the system environment 100. For example, the online system 130 is a social networking system, a content sharing network, or another system providing content to users.

While only three client devices 110a, 110b, and 110c are illustrated in conjunction with FIG. 1, there may be multiple instances of each of these entities. The client devices 110 are one or more computing devices capable of receiving user input as well as transmitting and/or receiving data via the network 140. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 140. In one embodiment, a client device 110 executes an application allowing a user of the client device 110 to interact with the online system 130. For example, a client device 110 executes a browser application to enable interaction between the client device 110 and the online system 130 via the network 140. In another embodiment, a client device 110 interacts with the online system 130 through an application programming interface (API) running on a native operating system of the client device 110, such as IOS® or ANDROID™.

One or more third party systems 120 may be coupled to the network 140 for communicating with the online system 130, which is further described below in conjunction with FIG. 2. In one embodiment, a third party system 120 is an application provider communicating information describing applications for execution by a client device 110 or communicating data to client devices 110 for use by an application executing on the client device. In other embodiments, a third party system 120 provides content or other information for presentation via a client device 110. A third party system 120 may also communicate information to the online system 130, such as event content including ticket prices, time, venue, and information about an application provided by the third party system 120.

The online system 130 is a computer system that includes software and hardware for performing a group of coordinated functions or tasks. The online system 130 includes multiple components for providing a framework for upselling ticketing events to one or more users of the online system 130. Here, the online system 130 may additionally or alternatively be a social networking system. The online system 130 is configured to receive requests from one or more client devices 110 and third party systems 120 and execute computer programs associated with the received requests. As an example, the online system 130 stores content associated with one or more users and content associated with an event in order to provide the event to a user of the one or more users with a threshold probability of attending the event. Software executing on the online system 130 can include a complex collection of computer programs, libraries, and related data that are written in a collaborative manner, in which multiple parties or teams are responsible for managing different components of the software.

The online system 130 provides a framework to provide content items describing events to one or more users of client devices 110. A content item associated with an event is also referred to herein as an event content. In FIG. 1A, a user profile 132 is associated with a user of the online system 130 and an event 134 associated with the third-party system 120. The user profile 132 and event 134 may be stored in a store (i.e., a user profile store and an event store) of the online system 130. The user profile store and the event store are described below in conjunction with FIG. 2.

Figure 1B:
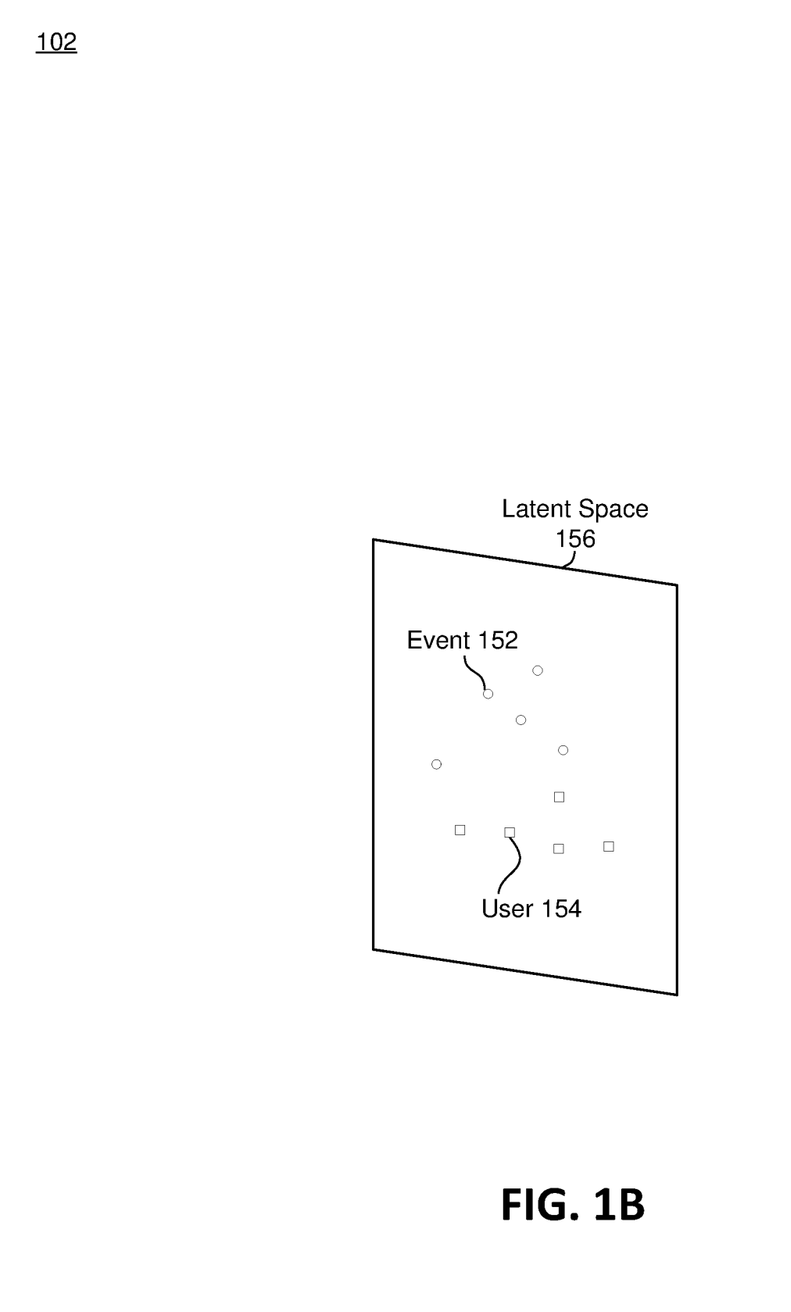
FIG. 1B is a graphical illustration of the function performed by a feature mapping module, in accordance with an embodiment

The online system 130 trains a deep neural network (DNN) using labels representing associations between users and events. In an embodiment, the online system trains two neural networks (e.g., a user neural network 142 and an event neural network 144). The online system extracts embeddings comprising a vector representation of the user profile 132 from the user neural network 142 and embedding comprising a vector representation of the event 134 from the neural network 144. Accordingly, the online system 130 extracts two vectors (i.e., one representing the user profile 142 and one representing the event 134) based on embeddings from the trained DNN. In one or more embodiments, the selected embeddings represent vectors mapped to a vector space (e.g., latent space). Accordingly, both events and users are mapped to the same latent space as shown in FIG. 1B. The selected embeddings associated with the user profile 132 and the event 134 are used by the online system to determine a degree of similarity between the user profile 132 and the event 134. In the embodiment of FIG. 1A, the user-event mapping module 136 determines a likelihood or probability of attendance of the user for an event based on a determined degree of similarity. The functionality performed by the user-event mapping module 136 is further described below in conjunction with FIG. 1B.

The online system 130 thus helps content providers sell more tickets to events by presenting to users content items offering tickets to those events. However, the online system 130 may not have a rich collection of data initially about which users might be interested in what events and which users are likely to be interested in buying tickets to events. To address this technical challenge or cold-start problem in which the model cannot draw inferences yet because it does not have sufficient data, the system uses two models that it can train independently to produce vectors that can be updated at different rates. While the event-based vector is recomputed more regularly as events change frequently, the user vector can be recomputed only periodically as user preferences do not change as quickly.

The content distribution module 138 distributes content items associated with the event 134 to the user associated with the user profile 132. In one or more embodiments, the content distribution module 138 distributes the event to a particular user content responsive to the determined probability of attendance of the particular user for the event being determined to be above a threshold value. In an embodiment, distributing content comprises sending a message to the user, providing an advertisement for the event, or presenting content associated with the event in a newsfeed associated with the user. In an embodiment, the content associated with an event includes a uniform resource locator (URL) or link to a website that allows the user to indicate that the user plans on attending the event, for example, by sending an RSVP message. In another embodiment, the content associated with an event includes a uniform resource locator (URL) or link to a website that allows the user to purchase a ticket for the event.

In some embodiments, the online system 130 trains a DNN in an offline mode. The modules comprising the online system 130 including the user-event mapping module 136, and the content distribution module 138 are described are further below in conjunction with FIG. 2.

The client devices 110 and the third party system 120 are configured to communicate with the online system 130 via the network 140. The network 140 may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

FIG. 1B is a graphical illustration 102 of the function performed by the user-event mapping module 136, in accordance with an embodiment. As shown in FIG. 1B, square shaped data points represent users and circular data points represent events. In an embodiment, the online system uses a distance between a vector representing a user and a vector representing an event as a measure of likelihood of the user attending the event or the measure of likelihood that the user is interested in the event. Small distances between a user and an event in the latent space 156 indicate high likelihood of the user attending the event and large distance distances between a user and an event in the latent space 156 indicate less likelihood of the user attending the event. Accordingly, the online system determines the measure of likelihood of a user attending an event as a value inversely related to the distance between the data points corresponding to the event and the user in the latent space 156.

The user-event mapping module 136 maps an event 152 and a user 154 onto a latent space 156. Here, the latent space

156 is an n-dimensional vector space defined by vectors representing events 152 and users 154. In one or more embodiments, the event 152 is represented as a vector extracted from the event 134 mapped to the latent space 156. Similarly, the user 154 is represented as a vector extracted from the user profile 132 and mapped to the latent space 156.

In an embodiment, the online system determines an angle between a vector representing an event 152 and a vector representing a user 154. The cosine of this angle defines a degree of similarity between the event 152 and the user 154. In various embodiments, the degree of similarity is a cosine similarity between the event 152 and the user 154. For example, if the cosine similarity of the event 152 and the user 154 is equal to 1, then the vector representing the event 152 is identical to the vector representing the user 156 in the latent space 156. In various embodiments, a cosine similarity equal to 1 indicates a very high measure of similarity between the user and the event. Correspondingly, if, for example, the cosine similarity of the event 152 and the user 154 is equal to 0, then the vector representing the event 152 is perpendicular to the vector representing the user 156 in the latent space 156 indicating a very low measure of similarity between the user 154 and the event 152. That is, the event 152 is maximally similar to the user 154 if the cosine the cosine similarity is 1 and the event 152 is maximally dissimilar to the user 154 if the cosine similarity is 0. Therefore, the cosine of the angle between two vectors in the latent space, generally, measures a degree of similarity between the event 152 and the user 154. In various embodiments, the determined degree of similarity between the event 152 and the user 154 is related to a probability that the user 154 will attend an event 152. Accordingly, the user-event mapping module 136 is configured to determine a probability of attendance for a user of the online system 130.

Figure 2:
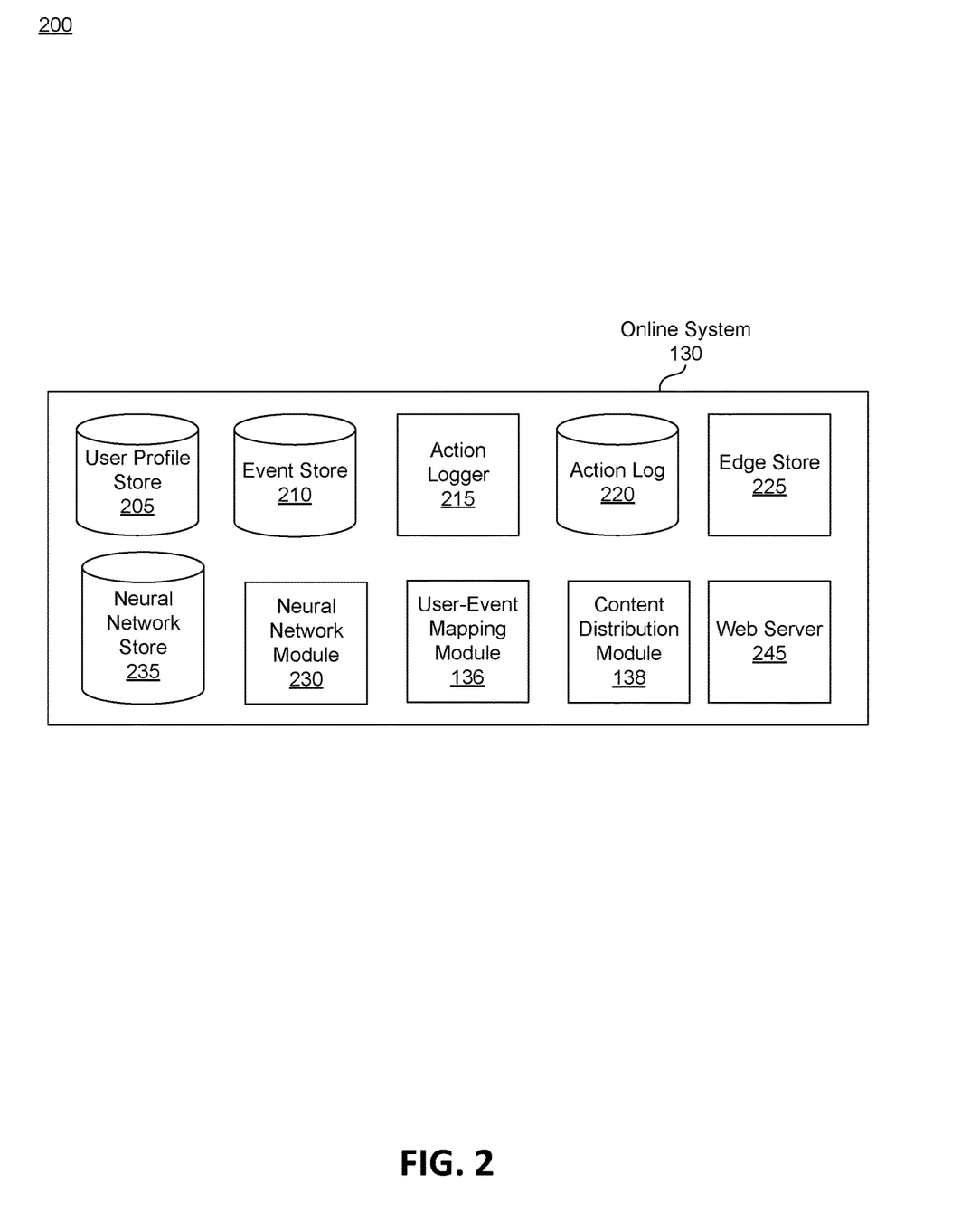
FIG. 2 is a block diagram of the social networking system, in accordance with an embodiment.

FIG. 2 is a block diagram 200 of an architecture of the online system 130. The online system 130 shown in FIG. 2 includes a user profile store 205, an event store 210, a user model store 215, an action log 220, a neural network store 235, neural network module 230, a user-event mapping module 136, and a content distribution module 138. In various embodiments, the online system 130 may additionally include a web server 245 and an edge store 225. In still other embodiments, the online system 130 may include additional, fewer, or different components for various applications. Conventional components such as network interfaces, security functions, load balancers, failover servers, management and network operations consoles, and the like are not shown so as to not obscure the details of the system architecture.

Each user of the online system 130 is associated with a user profile. Content associated with the user profile (e.g., user profile 132) is stored in the user profile store 205. A user profile includes declarative information about the user that was explicitly shared by the user and may also include profile information inferred by the online system 130. In one embodiment, a user profile includes multiple data fields, each describing one or more attributes of the corresponding online system user. Examples of information stored in a user profile include biographic, demographic, and other types of descriptive information, such as work experience, educational history, gender, interests, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to one or more previous events attended by the user in the event store 210 and stored in the action log 220. The event store 210 and the action log 220 are both further described below.

While user profiles in the user profile store 205 are frequently associated with individuals, allowing individuals to interact with each other via the online system 130, user profiles may also be stored for entities such as businesses or organizations. This allows an entity to establish a presence on the online system 130 for connecting and exchanging content with other online system users. The entity may post information about itself, about its products or provide other information to users of the online system 130 using a brand page associated with the entity's user profile. Other users of the online system 130 may connect to the brand page to receive information posted to the brand page or to receive information from the brand page. A user profile associated with the brand page may include information about the entity itself, providing users with background or informational data about the entity.

The event store 210 stores objects associated with various types of events associated with a third-party system (e.g., third party system 120). Examples of content represented by an object include a page post, a status update, a photograph, a video, a link, a shared content item, a gaming application achievement, a check-in event at a local venue associated with the event, a brand page, traffic information, weather information, and ticket prices. Online system users may create objects stored by the event store 210, such as status updates, photos tagged by users to be associated with other objects in the online system 130, events, groups, or applications. In some embodiments, objects are received from third-party applications or third-party applications separate from the online system 130. In one embodiment, objects in the event store 210 represent single pieces of content, or content "items." Hence, online system users are encouraged to communicate with each other by posting text and content items of various types of media to the online system 130 through various communication channels. This increases the amount of interaction of users with each other and increases the frequency with which users interact within the online system 130.

The action logger 215 receives communications about user actions internal to and/or external to the online system 130, populating the action log 220 with information about user actions. Examples of actions taken by the user on the online system 130 include providing an RSVP to a future event posted by another user, posting a message on a page associated with the event, posting a status update including one or more keywords associated with an event, and attending a previous event posted by another user. Here, another user includes another user of the online system (e.g., online system 130) and associated with a client device 110 or a user on the third-party system (e.g., third party system 120). Examples of actions taken by the user external to the online system 130 include buying tickets to the event, visiting a webpage associated with an event, and buying tickets to an event. In addition, a number of actions may involve an object and one or more users, so these actions are associated with the users as well and stored in the action log 220.

The action log 220 may be used by the online system 130 to track user actions on the online system 130, as well as actions on third party systems 120 that communicate information to the online system 130. Users may interact with various objects on the online system 130, and information describing these interactions is stored in the action log 220.

Examples of interactions with objects include: commenting on posts, commenting on a page associated with a third party event, sharing links, checking-in to physical locations via a client device 110, accessing content items, and any other suitable interactions. Additional examples of interactions with objects on the online system 130 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 130 as well as with other applications operating on the online system 130. In some embodiments, data from the action log 220 is used to infer interests or preferences of a user, augmenting the interests included in the user's user profile, and allowing a more complete understanding of user preferences.

The action log 220 may also store user actions taken on a third-party system 120, such as an external website, and communicated to the online system 130. For example, an e-commerce website may recognize a user of an online system 130 through a social plug-in enabling the e-commerce website to identify the user of the online system 130. Because users of the online system 130 are uniquely identifiable, e-commerce websites, such as in the preceding example, may communicate information about a user's actions outside of the online system 130 to the online system 130 for association with the user. Hence, the action log 220 may record information about actions users perform on a third-party system 120, including webpage viewing histories, advertisements that were engaged, purchases made, and other patterns from shopping and buying. Additionally, actions a user performs via an application associated with a third-party system 120 and executing on a client device 110 may be communicated to the action logger 215 by the application for recordation and association with the user in the action log 220.

In one embodiment, the edge store 225 stores information describing connections between users and other objects on the online system 130 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 130, such as expressing interest in a page on the online system 130, sharing a link with other users of the online system 130, and commenting on posts made by other users of the online system 130. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate, or an amount of information retrieved by one user about an object, or numbers and types of comments posted by a user about an object. The features may also represent information describing an object or user. For example, a feature may represent the level of interest that a user has in a topic, the rate at which the user logs into the online system 130, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 130 over time to approximate a user's interest in an object or in another user in the online system 130 based on the actions performed by the user. A user's affinity may be computed by the online system 130 over time to approximate the user's interest in an object, in a topic, or in another user in the online system 130 based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The neural network store 235 stores one or more trained neural networks. Neural networks stored in the neural network store 235 may be associated with users or with events received from a third-party system (e.g., third-party system 120), or a combination thereof. Each neural network stored in the neural network store 235 comprises an input layer, one or more hidden layers, and an output layer. Here, each layer of a neural network is comprised of a net of interconnected nodes. Each node in a neural network is performs a calculation to generate an output via a system of weighted connections to the nodes in a previous layer and a next layer and a sigmoidal activation function. A stored neural network is configured to receive, as an input, an input vector (e.g., a vector associated with an event 152 or a vector associated with a user 154) via an input layer. Here, a received input vector is associated with one of a user of the online system 130 or an event provided by a third-party system (e.g., third-party system 120). Each of the one or more neural networks stored in the neural network store 235 generates an output that is some function of the received input vector. The neural networks stored in the neural network store 235 are further described below in conjunction with FIG. 3.

The neural network module 230 trains a DNN to extract embeddings from a user vector (e.g., a vector associated with a user 154) and an event vector (e.g., a vector associated with an event 152). An example user vector for a user of the online system 130 includes information indicating that the user is 25 years old, is a member of 3 concert groups in the online system 130, has expressed an interest in the "Beatles," has attended 3 "John Lennon" concerts in the past 6 months, and lives 25 miles from New York City. An example event vector associated with a "John Lennon" concert includes information indicating that the event is in "New York City" and a target demographic is men and women between the ages of 25 and 50. In various embodiments, the event vector may also include information about interactions by other users associated with the user. For example, if another user of the online system 130 who is connected to the user via an edge (e.g., a friend), then the event vector may additionally include this information. In an embodiment, an attribute of a user or event is represented using a one hot vector. For example, the gender of a user may be represented using a bit vector in which each bi corresponds to a gender value. Similarly the age of a user may be represented by a vector in which the nth element stores 1 if the user has age value N and the remaining elements store 0. The neural network module 230 is further described below in conjunction with the FIG. 4.

The user-event mapping module 136 determines a probability of attendance associated with a user of the online system. Here, the user-event mapping module 136 is an embodiment of user-event mapping module 136 described above in conjunction with FIGS. 1A and 1B. In various embodiments, the user-event mapping module 136 determines a probability of attendance associated based on a measure of similarity. The user-event mapping module 136 is further described below in conjunction with FIG. 4.

The content distribution module 138 is an embodiment of the content distribution module 138 described above in conjunction with FIG. 1A. Here, the content distribution module 138 distributes the event associated with the event 134 to the user associated with the user profile 132. The content distribution module 138 is further described below in conjunction with FIG. 4.

The web server 245 links the online system 130 via the network 140 to the one or more client devices 110, as well as to the one or more third party systems 120. The web server 245 serves web pages, as well as other content, such as JAVA®, FLASH®, XML, and so forth. The web server 245 may receive and route messages between the online system 130 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the event store 210. Additionally, the web server 245 may provide application programming interface (API) functionality to send data directly to native client device operating systems, such as IOS®, ANDROID™, or BlackberryOS.

Figure 3:
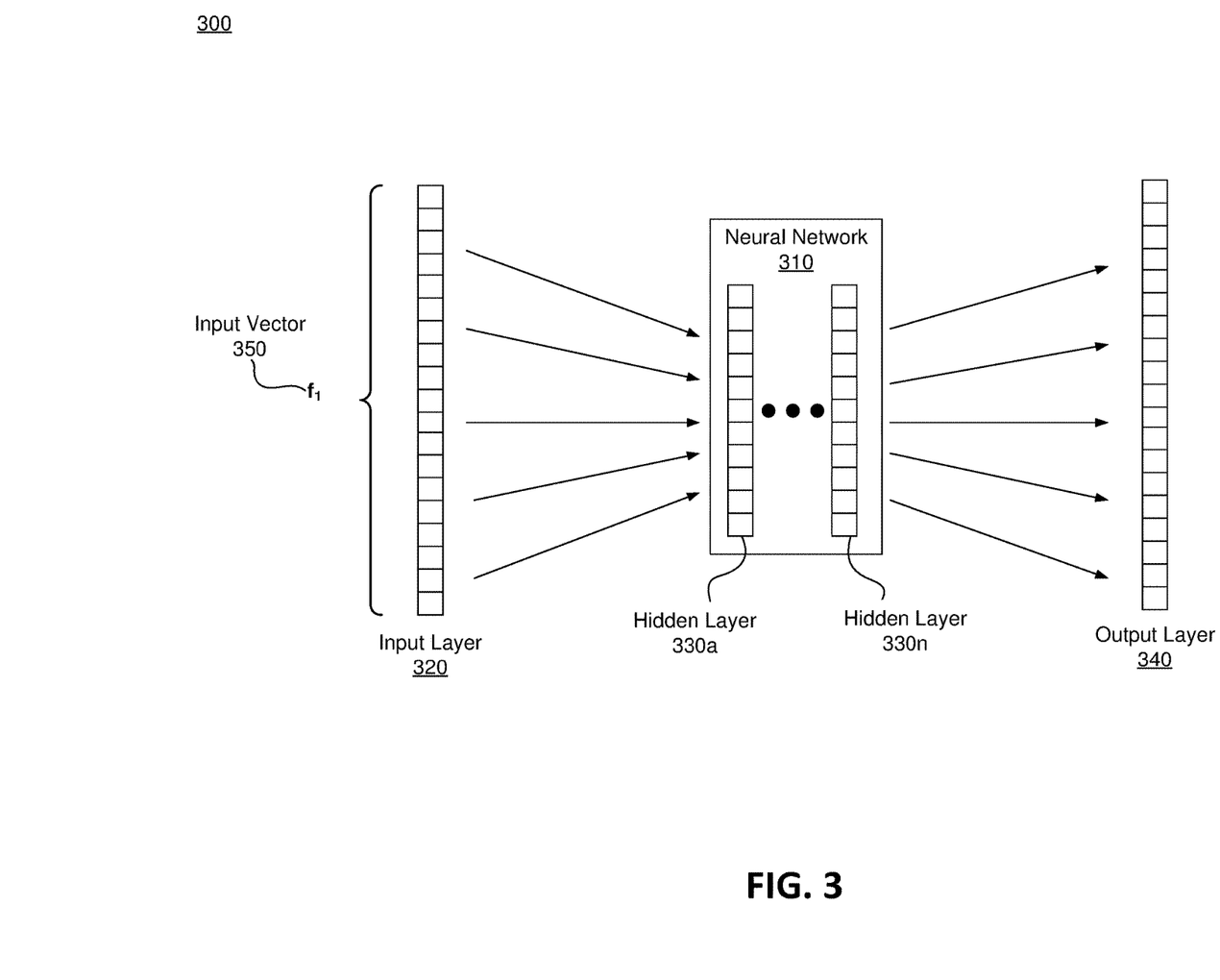
FIG. 3 shows a diagram of an example neural network maintained by a neural network store in accordance with an embodiment.

FIG. 3 shows a diagram 300 of an example neural network 310 maintained by a neural network store (e.g., neural network store 235), in accordance with an embodiment. The neural network 310 is stored in a neural network store associated with the online system (e.g., online system 130). The neural network 310 includes an input layer 320, one or more hidden layers 330a-n, and an output layer 340. Each layer of the neural network 310 (i.e., the input layer 320, the output layer 340, and the hidden layers 330a-n) comprises a set of nodes such that the set of nodes of the input layer 320 are input nodes of the neural network 310, the set of nodes of the output layer 340 are output nodes of the neural network 310, and the set of nodes of each of the hidden layers 330a-n are hidden nodes of the neural network 310. Generally, nodes of a layer may provide input to another layer and may receive input from another layer. Nodes of each hidden layer are associated with two layers, a previous layer, and a next layer. The hidden layer receives the output of the previous layer as input and provides the output generated by the hidden layer as input to the next layer.

Each node has one or more inputs and one or more outputs. Each of the one or more inputs to a node comprises a connection to an adjacent node in a previous layer and an output of a node comprises a connection to each of the one or more nodes in a next layer. That is, each of the one or more outputs of the node is an input to a node in the next layer such that each of the node is connected to every node in the next layer via its output and is connected to every node in the previous layer via its input. Here, the output of a node is defined by an activation function that applies a set of weights to the inputs of the nodes of the neural network 310. Example activation functions include an identity function, a binary step function, a logistic function, a TanH function, an ArcTan function, a rectilinear function, or any combination thereof. Generally, an activation function is any non-linear function capable of providing a smooth transition in the output of a neuron as the one or more input values of a neuron change. In various embodiments, the output of a node is associated with a set of instructions corresponding to the computation performed by the node. Here, the set of instructions corresponding to the plurality of nodes of the neural network may be executed by one or more computer processors.

In one embodiment, the input vector 310 is a vector comprising content items associated with a user of the online system 130 (e.g., items stored in the user profile store 205, action log 220, and edge store 225). For example, an input vector 310 comprises demographic information (e.g., age group of the user), groups that the user is associated with (e.g., a member of a page associated with the event), a geographic location (e.g., the user is within 10 miles of a geographic location associated with an event), a number and/or type of actions performed by the user on a content item associated with an event either on or off the online system 130, or any combination thereof. In other embodiments, the input vector 310 additionally, or alternatively, comprises one or more items associated with an event (e.g., items stored in the event store 210). For example, the input vector 310 may include information describing a time and date associated with the event, a number of other users of the online system 130 who have expressed an interest in the event, a number of messages associated with the event, or any combination thereof.

The neural network 310 generates as output comprising value, or a score. An output generated by the neural network 310 is, for example, a score indicating a likelihood of the input user attending the input event. The hidden layer 330n of the neural network 310 generates a numerical vector representation of an input vector also referred to as an embedding. The numerical vector is a representation of the input vector mapped to a latent space (latent space 156).

The connections between nodes in the neural network 310 each include a weight. In one or more embodiments, training the neural network 310 comprises adjusting values for weights of the neural network 310 to minimize or reduce a loss function associated with the neural network 310. Training the neural network 310 is further described below in conjunction with FIG. 4.

Figure 4:
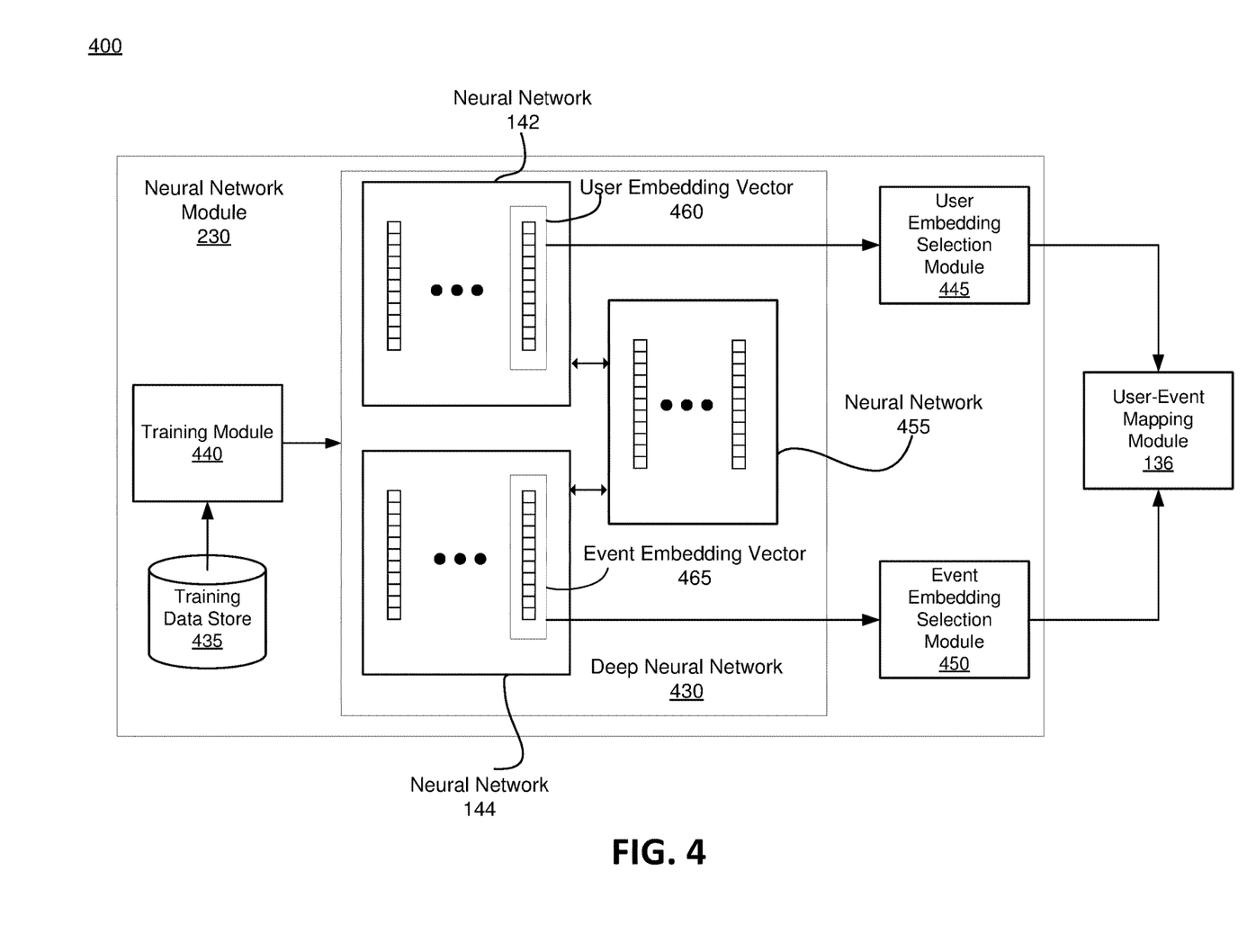
FIG. 4 shows an example system architecture for determining a probability that a user of the online system will attend an event associated with a third-party system, in accordance with an embodiment.

FIG. 4 shows an example system architecture 400 for determining a probability that a user of the online system will attend an event associated with a third-party system, in accordance with an embodiment. The system architecture 400 comprises a neural network module 230 and a feature mapping module 136. In FIG. 4, the neural network module 230 comprises a DNN 430, a training data store 435, a training module 440, a user embedding selection module 445, and an event embedding selection module 450. The DNN 430 comprises the neural network 142 and a neural network 144 that are trained in parallel through a neural network 455. Each of the neural networks 142, 144, and 455 is an embodiment of the neural network 310 described above in conjunction with FIG. 3. The system architecture 400 depicted in conjunction with FIG. 4 is just one example embodiment of a system architecture 400 for determining the probability of a user of the online system attending an event associated with a third-party system. In other embodiments, the system architecture 400 may include additional or fewer modules than those shown in FIG. 4. Furthermore, specific functionality may be implemented by modules other than those described herein. In some embodiments, various components illustrated in FIG. 4 may be executed by different online systems 130. For example, the neural networks 142, 144, and 455 may be executed by one or more processors different from the processors associated with the modules described herein.

The neural network 142 and the neural network 144 are each configured to receive an input vector and generate an output based on the received input vector. Generally, the output of both the neural network 142 and the neural network 144 is some function of the received input vector. In the embodiment depicted in conjunction with FIG. 4, the neural network 142 is configured to receive, as an input, a user vector (e.g., a vector associated with a user 154) and neural network 144 is configured to receive, as an input, an event vector (e.g., a vector associated with an event 152). The outputs of the neural network 142 and 144 is some function of the relationship between a user associated with the user vector received neural network 142 and the event vector received by neural network 144.

The neural network 455 is configured to receive, as inputs, the output generated by both the neural network 142 and the neural network 144. The neural network 455 is configured to generate an output associated with a relationship between a user vector and an event vector. In various embodiments, the neural network 455 changes the weights of neural network 142 and neural network 144 based on various learning algorithms. Here, changing the weights of neural network 142 and neural networks 144 comprises adjusting the weights between individual neurons of the hidden layers to reduce a total measure of error between a predicted output and actual output. In an example embodiment, the neural network 455 is configured to implement a backpropagation algorithm. In various embodiments, performing backpropagation comprises performing a gradient decent based on a cost function that defines how far a solution is from an optimal solution.

The training data store 435 stores a training dataset for training the DNN 430. The training dataset comprises labelled samples of data. Here, samples are associated with how a particular user of the online system as responded to similar events in the past. The labels assigned to each sample of data represent the expected output corresponding to the sample data. For example, the training data store 435 may include three columns, one for event data, one for user data, and one for a label describing the relationship between the user and the event. Labels may be, for example, 1 if a user attended an event and −1 if the user did not respond to the event. The training data may be based on historical data or may be manually provided, for example, by an expert user interacting with the online system via a user interface configured to allow users to enter labels.

The training module 440 trains the DNN 430. In an embodiment, the training module 430 trains the DNN 430 by comparing the result of executing the DNN 430 for a sample input data with the expected label associated with the sample input data to determine a measure of error in the generated result. The errors observed in the generated results of various sample input data values are fed back into the DNN 430 to adjust the various weights associated with the nodes and the connections of the DNN 430 (e.g., a backpropagation algorithm). This process is repeated iteratively until an aggregate metric based on the error is determined to be below certain threshold value. The training module 440 repeats the process of training the DNN 430 through multiple iterations. The training process is typically performed offline.

The neural network module 230 is executed during an online processing when the online system receives events and identifies content items associated with the events for distributing to users. The online system provides user and event data to the neural network 142 and neural network 144 to generate a user embedding 460 and an event embedding 465, respectively. The embeddings (i.e., the user embedding 460 and the event embedding 465) each represent the sample input data at a layer within the neural network. An embedding is represented as a vector having one or more dimensions. A user embedding selection module 445 selects embeddings from a hidden layer of the neural network 142. An event embedding selection module 450 selects embeddings from a hidden layer of the neural network 144. In an embodiment, both the user embedding selection module 445 and the event embedding selection module 450 select embeddings from the last hidden layer of the neural networks 142 and 144, respectively. The user embedding selection module 445 and the event embedding selection module 450 both provide the selected embeddings to the feature mapping module 136. As further described above, the feature mapping module 136 is configured to determine a probability of attendance of the event for a user based on the selected embeddings associated with the user.

In an embodiment, the neural network module 230 receives a dataset in which most of the samples are unlabeled. In an iteration, the DNN 430 is trained on only the labeled samples from the original sample dataset. At the end of each iteration, the trained DNN 430 runs a forward pass on the entire dataset to generate embeddings representing sample data. The neural network module 230 labels the received unlabeled sample set and adds it to the labeled sample set, which is provided as input data for the next training iteration.

In various configurations, the online system includes the content distribution module 138. The content distribution module 138 is configured to provide the event to one or more users of the online system based on the determined probability of attendance being above a threshold value. Here, the threshold probability of attendance may be selected by the third-party system. For example, if a threshold probability of attendance is 75%, then a user associated with a probability of attendance of 20% would not be provided the event content by the content distribution module. On the other hand, a user associated with a determined probability of attendance of 90% would be provided the event. In an embodiment, providing an event to a user comprises placing one or more content items associated with the event in the user's newsfeed. In other embodiments, the content distribution module 138 may additionally or alternatively generate and send a message to the user. In another embodiment, the content distribution module may also target the user with a sponsored content item, for example, an advertisement associated with the event. In still other embodiments, the content distribution module may perform any combination of targeting the user with a sponsored content associated with the event, present content associated with the event in a news feed associated with the event, and generate and send a message to a user wherein the message includes one or more content items associated with the event.

Overall Process

Figure 5:
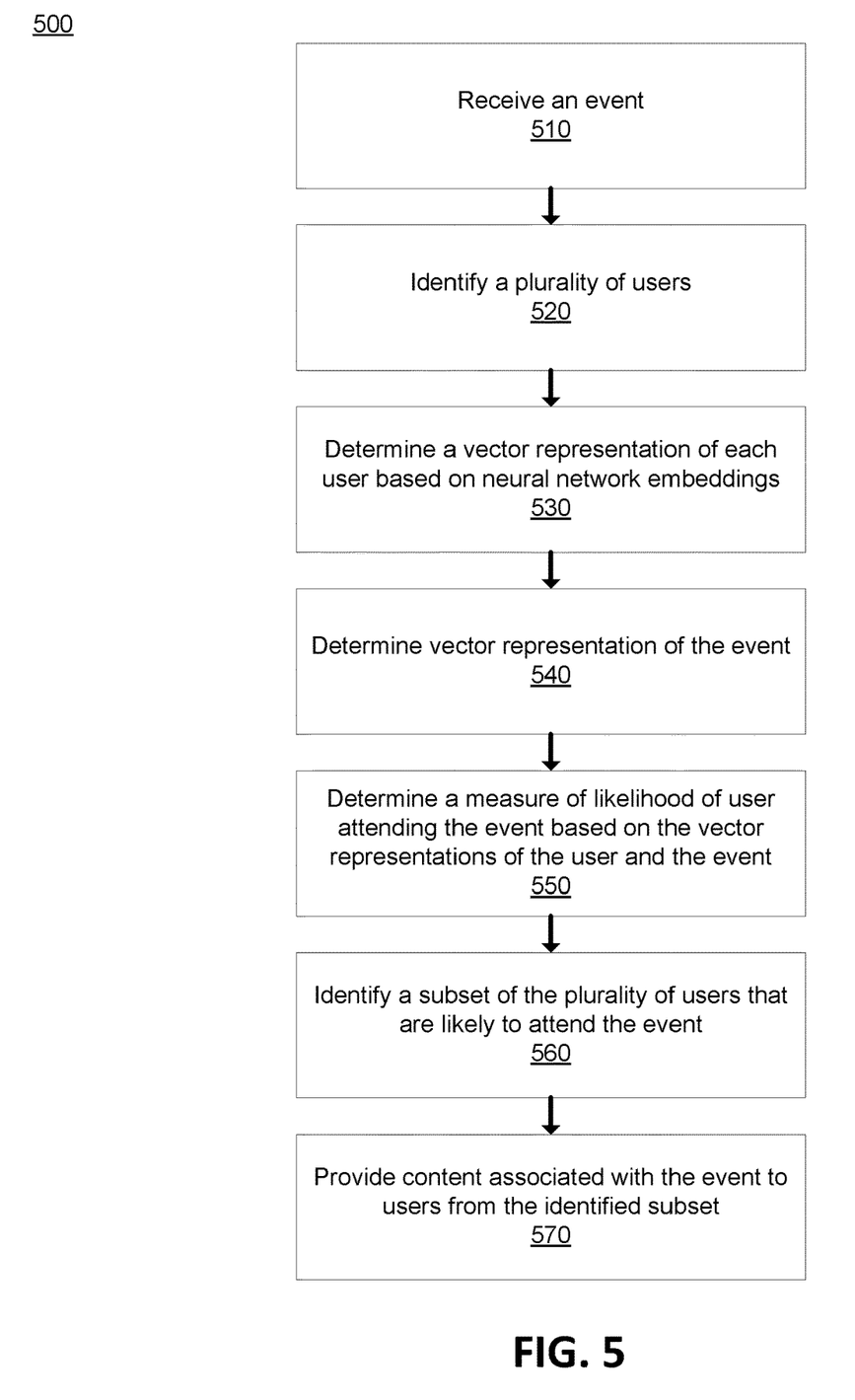
FIG. 5 illustrates a process for upselling ticketing events to users, in accordance with an embodiment.

FIG. 5 illustrates a process for upselling ticketing events to users, in accordance with an embodiment. The online system (e.g., online system 130) receives 510 content describing an event from a third-party system (e.g., third-party system 120). Content describing the event includes a venue associated with the event, a geographic location associated with the event, a time, and date associated with the event, ticket prices, and any combination thereof. The online system identifies 520 a plurality of users as potential users for receiving content associated with the event. In some embodiments the online system determines the plurality of users based on simple criteria, for example, users in close proximity of the location of the event.

The online system determines 530 a vector representation for each of the plurality of users based on embeddings extracted from the user neural network 142. The online system determines 540 a vector representation for the event based on embeddings extracted from the event neural network 144.

The online system determines 550, for each of the plurality of users, a measure of a likelihood of the user being interested in the event, or a measure of likelihood of the user attending the event. In various embodiments, the determined likelihood is based on a measure of distance between the vector representation of a user and the vector representation of the event. The online system identifies 560 a subset of the plurality of users that are likely to attend the event. In an embodiment, the subset of the plurality of user is identified by, for example, comparing the determined 550 measure of likelihood of the user attending the event with a threshold value and selecting all users that have more than the threshold likelihood of attending the event.

The online system provides 570 content associated with the event to one or more users of the identified 560 subset of users. In an embodiment, the online system provides 540 content associated with the event responsive to the determined probability of attendance being above a threshold value. Here, providing content associated with the event includes sending message to the user through the online system, placing content associated with the event on a newsfeed associated with the user, presenting an ad to the user, or any combination thereof.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, an event from a third-party system, the event associated with one or more content items describing the event;
storing, by the online system, interactions of users with content items describing events, the stored interactions including RSVP messages sent by the users to indicate intentions to attend the events;
performing joint training of a first neural network and a second neural network using training data comprising labels representing the stored interactions of the users with the content items describing events and using a third neural network that changes respective weights of the first neural network and the second neural network, receives, as inputs, vector representations of users and events generated by the first neural network and the second neural network, and generates an output associated with a relationship between the vector representations of users and events;
identifying a plurality of users of the online system;
for each of the plurality of users of the online system:
providing information describing the user as input to the first neural network, and
generating a vector representation for the user using the first neural network;

providing information describing the event as input to the second neural network, the first neural network and the second neural network having been jointly trained using historical user-event interactions;

generating a vector representation for the event using the second neural network;

for each of the plurality of users, determining a measure of distance between the vector representation of the user and the vector representation of the event;

selecting a subset of the plurality of users of the online system as users likely to be interested in the event based on the determined measures of distance; and sending a content item of the one or more content items describing the event to the selected subset of users of the online system.

2. The method of claim 1, wherein the training data comprises user attributes, event attributes, and labels indicating whether a particular user was determined to be interested in an event.

3. The method of claim 2, wherein a user attribute of the user attributes for a particular user describes membership of the user in particular user groups.

4. The method of claim 2, wherein a user attribute of the user attributes for a particular user describes web pages that the user interacts with.

5. The method of claim 2, wherein a user attribute of the user attributes for a particular user describes demographic attributes of the user.

6. The method of claim 2, wherein an event attribute of the event attributes for a particular event describes a subject of the event.

7. The method of claim 2, wherein an event attribute of the event attributes for a particular event describes a location of the event.

8. The method of claim 1, wherein generating the vector representation of the user comprises extracting an embedding from a hidden layer of the first neural network and generating the vector representation of the event comprises extracting an embedding from a hidden layer of the second neural network.

9. The method of claim 1, wherein vector representations of the plurality of users are generated from the first neural network on a periodic basis and the vector representation of the event is performed responsive to receiving information describing the event.

10. The method of claim 1, wherein:

for each of the plurality of users, determining the measure of distance between the vector representation of the user and the vector representation of the event comprises:

determining a cosine similarity between the vector representation of the user and the vector representation of the event; and selecting the subset of the plurality of users of the online system as users likely to be interested in the event based on the determined measures of distance comprises:

for each cosine similarity associated with a respective user of the plurality of users:

determining a probability of attendance of the respective user, and comparing the probability of attendance to a threshold value; and identifying the subset of the plurality of users having probabilities of attendance greater than the threshold value.

11. The method of claim 1, wherein the content item of the one or more content items describing the event enables the subset of the plurality of users to perform one or more of sending an RSVP message or purchasing a ticket for the event.

12. A non-transitory computer readable storage medium comprising computer instructions that when executed by a processor causes the processor to:

receive at an online system, an event from a third-party system, the event associated with one or more content items describing the event;

store interactions of users with content items describing events, the stored interactions including RSVP messages sent by the users to indicate intentions to attend the events;

perform joint training of a first neural network and a second neural network using training data comprising labels representing the stored interactions of the users with the content items describing events and using a third neural network that changes respective weights of the first neural network and the second neural network, receives, as inputs, vector representations of users and events generated by the first neural network and the second neural network, and generates an output associated with a relationship between the vector representations of users and events;

identify a plurality of users of the online system;

for each of the plurality of users of the online system:

provide information describing the user as input to the first neural network and generate a vector representation for the user using the first neural network;

provide information describing the event as input to the second neural network, wherein the first neural network and the second neural network were jointly trained using historical user-event interactions;

generate a vector representation for the event using the second neural network; and for each of the plurality of users, determining a measure of distance between the vector representation of the user and the vector representation of the event;

select a subset of the plurality of users of the online system as users likely to be interested in the event based on the determined measures of distance; and send content describing the event to the selected subset of users of the online system.

13. The non-transitory computer readable medium of claim 12, wherein the training data comprises user attributes, event attributes, and labels indicating whether a particular user was determined to be interested in an event.

14. The non-transitory computer readable medium of claim 13, wherein a user attribute of the user attributes for a particular user describes membership of the user in particular user groups.

15. The non-transitory computer readable medium of claim 13, wherein a user attribute of the user attributes for a particular user describes web pages that the user interacts with.

16. The non-transitory computer readable medium of claim 13, wherein a user attribute of the user attributes for a particular user describes demographic attributes of the user.

17. The non-transitory computer readable medium of claim 13, wherein an event attribute of the event attributes for a particular event describes a subject of the event.

18. The non-transitory computer readable medium of claim 13, wherein an event attribute of the event attributes for a particular event describes a location of the event.

19. The non-transitory computer readable medium of claim 12, wherein generating the vector representation of the user comprises extracting an embedding from a hidden layer of the first neural network and generating the vector representation of the event comprises extracting an embedding from a hidden layer of the second neural network.

20. The non-transitory computer readable medium of claim 12, wherein vector representations of the plurality of users are periodically generated from the first neural network and the vector representation of the event is performed responsive to receiving information describing the event.

* * * * *

UNITED STATES PATENT AND TRADEMARK OFFICE
CERTIFICATE OF CORRECTION

PATENT NO. : 11,379,715 B2
APPLICATION NO. : 15/843913
DATED : July 5, 2022
INVENTOR(S) : Tang et al.

It is certified that error appears in the above-identified patent and that said Letters Patent is hereby corrected as shown below:

In the Claims

In Column 16, Claim 12, Line 28, delete "network and" and insert -- network, and --, therefor.

In Column 16, Claim 12, Lines 28-29, delete "generate a vector representation for the user using the first neural network;" and insert the same at Line 29 as a new sub-point.

In Column 16, Claim 12, Line 35, delete "network; and" and insert -- network; --, therefor.

In Column 16, Claim 13, Line 44, delete "readable medium" and insert -- readable storage medium --, therefor.

In Column 16, Claim 14, Line 48, delete "readable medium" and insert -- readable storage medium --, therefor.

In Column 16, Claim 15, Line 52, delete "readable medium" and insert -- readable storage medium --, therefor.

In Column 16, Claim 16, Line 56, delete "readable medium" and insert -- readable storage medium --, therefor.

In Column 16, Claim 17, Line 60, delete "readable medium" and insert -- readable storage medium --, therefor.

In Column 16, Claim 18, Line 63, delete "readable medium" and insert -- readable storage medium --, therefor.

In Column 16, Claim 19, Line 66, delete "readable medium" and insert -- readable storage medium --, therefor.

Signed and Sealed this
Thirtieth Day of August, 2022

Katherine Kelly Vidal
*Director of the United States Patent and Trademark Office*

CERTIFICATE OF CORRECTION (continued)
U.S. Pat. No. 11,379,715 B2

In Column 17, Claim 20, Line 5, delete "readable medium" and insert -- readable storage medium --, therefor.